United States Patent
Bogdanski et al.

(10) Patent No.: US 9,130,858 B2
(45) Date of Patent: Sep. 8, 2015

(54) SYSTEM AND METHOD FOR SUPPORTING DISCOVERY AND ROUTING DEGRADED FAT-TREES IN A MIDDLEWARE MACHINE ENVIRONMENT

(71) Applicant: Oracle International Corporation, Redwood Shores, CA (US)

(72) Inventors: Bartosz Bogdanski, Oslo (NO); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 168 days.

(21) Appl. No.: 13/839,823

(22) Filed: Mar. 15, 2013

(65) Prior Publication Data
US 2014/0064287 A1 Mar. 6, 2014

Related U.S. Application Data

(60) Provisional application No. 61/694,658, filed on Aug. 29, 2012.

(51) Int. Cl.
*H04L 12/933* (2013.01)
*H04L 12/753* (2013.01)

(52) U.S. Cl.
CPC .................. *H04L 49/15* (2013.01); *H04L 45/48* (2013.01)

(58) Field of Classification Search
CPC .......... H04L 49/15; H04L 45/00; H04L 45/48
See application file for complete search history.

(56) References Cited

U.S. PATENT DOCUMENTS

2005/0071709 A1 3/2005 Rosenstock et al.
2013/0114620 A1* 5/2013 Bogdanski .................... 370/408
2013/0121154 A1* 5/2013 Guay et al. .................... 370/236

OTHER PUBLICATIONS

Guay et al., "dFtree—A Fat-tree Routing Algorithm using Dynamic Allocation of Virtual Lanes to Alleviate Congestion in InfiniBand Networks", Nov. 14, 2011, ACM, NDM '11, pp. 1-10.*
Bogdanski et al., "Achieving Predictable High Performance in Imbalanced Fat Trees", Dec. 8-10, 2010, IEEE, 16th International Conference on Parallel and Distributed Systems, pp. 1-8.*
Guay et al., "vFtree—A Fat-tree Routing Algorithm using Virtual Lanes to Alleviate Congestion", May 16-20, 2011, IEEE, IEEE International Parallel & Distributed Processing Symposium, pp. 1-12.*
European Patent Office International Searching Authority, International Search Report and Written Opinion dated Feb. 19, 2014 for Application No. PCT/US2013/057370, 11 pages.
Bartosz Bogdanski et al., "Discovery and Routing of Degraded Fat-Trees". Retrieved Feb. 24, 2014. 6 pages. https://simula.no/publications/Simula.simula.1554/simula_pdf_file.
Nishanth Dandapanthula, "InfiniBand Network Analysis and Monitoring using OpenSM". Retrieved Feb. 24, 2014. 82 pages. https://etd.ohiolink.edu/ap/6?0::NO:6:P6_ABSTRACT%2CP6_ACCESSION_NUM%2CP6_AUTHOR%2CP6_COMMITTEE_MEMBER%2CP6_DEGREE_NAME%2CP6_DEGREE_YEAR_FROM%2CP6_DEGREE_YEAR_TO%2CP6_ETD_INST_DEPTID%2CP6_INSTID%2CP6_KEYWORDS%2CP6_SUBJECTS%2CP6_TITLE%2CP6_ETD_LANGUAGEID%2CP6_PAGE:%2C%2Cdandapanthula%2C%2C%2C%2C%2C%2C19%2C%2C%2Cinfiniband+network+analysis+and+monitoring+using+opensm%2C%2C1.

* cited by examiner

*Primary Examiner* — Paul H Masur
(74) *Attorney, Agent, or Firm* — Tucker Ellis LLP

(57) ABSTRACT

A system and method can support discovering and routing in a fabric with a plurality of switches. The system allows one or more switches in the fabric to be tagged with a switch role. Then, a subnet manager in the fabric detect the switch role that is associated with the one or more switches. Furthermore, a routing algorithm can be applied on the fabric based on the detected switch role associated with the one or more switches.

20 Claims, 4 Drawing Sheets

SYSTEM AND METHOD FOR SUPPORTING DISCOVERY AND ROUTING DEGRADED FAT-TREES IN A MIDDLEWARE MACHINE ENVIRONMENT

CLAIM OF PRIORITY

This application claims priority on U.S. Provisional Patent Application No. 61/694,658, entitled "SYSTEM AND METHOD FOR SUPPORTING DISCOVERY AND ROUTING DEGRADED FAT-TREES IN A MIDDLEWARE MACHINE ENVIRONMENT" filed Aug. 29, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a middleware machine environment.

BACKGROUND

The fat-tree topology is used for high performance computing (HPC) clusters, and for clusters based on InfiniBand (IB) technology. For fat-trees, as with most other topologies, the routing algorithm is beneficial for efficient use of the network resources. However, the existing routing algorithms have a limitation when it comes to switch-to-switch communication. None of the existing routing algorithms support deadlock free and fully connected switch-to-switch communication which is beneficial for efficient system management. These are the generally areas that embodiments of the invention are intended to address.

SUMMARY

Described herein are systems and methods that can support discovering and routing in a fabric with a plurality of switches. The system allows one or more switches in the fabric to be tagged with a switch role. Then, a subnet manager in the fabric can detect the switch role that is associated with the one or more switches. Furthermore, a routing algorithm can be applied on the fabric based on the detected switch role associated with the one or more switches.

DETAILED DESCRIPTION

Figure 1:
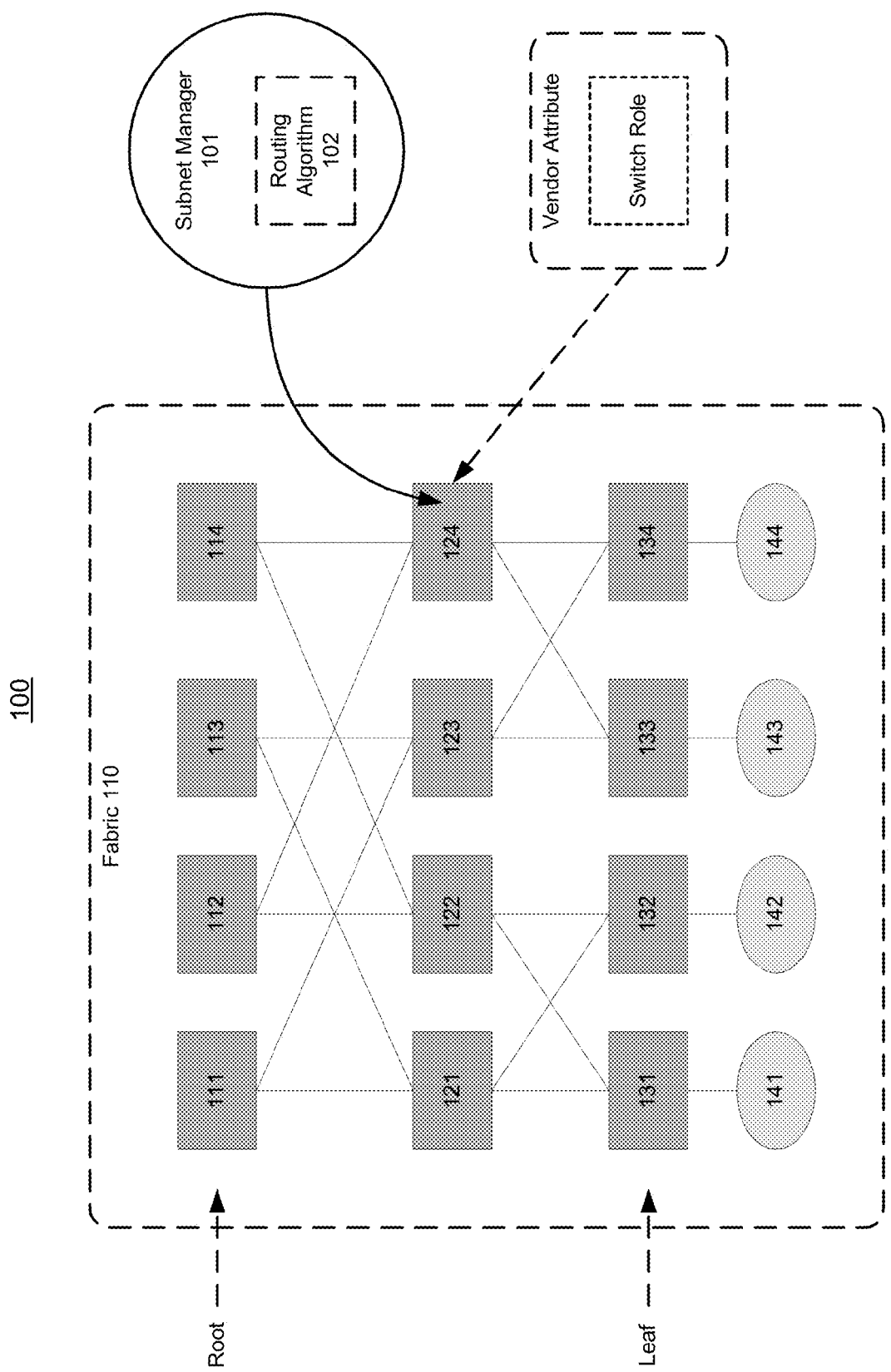
FIG. 1 shows an illustration of supporting a switch roles mechanism in a network environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation. Also, the description of the invention as following uses the fat-tree topology as an example for a fabric topology. It will be apparent to those skilled in the art that other types of fabric topologies can be used without limitation.

Described herein are systems and methods that can support can support discovering and routing in a fabric with a plurality of switches.

InfiniBand (IB) Architecture

In accordance with an embodiment of the invention, IB networks can be referred to as subnets, where a subnet consists of a set of hosts interconnected using switches and point-to-point links. An IB fabric can constitute one or more subnets, each of which can be interconnected using routers. Hosts and switches within a subnet are addressed using local identifiers (LIDs) and a single subset is limited to 49151 LIDs.

An IB subnet can have at least one subset manager (SM), which is responsible for initializing and bringing up the network, including the configuration of all the IB ports residing on switches, routers, and host channel adapters (HCAs) in the subnet. At the time of initialization, the SM starts in a discovering state where the SM does a sweep of the network in order to discover all switches and hosts. During the discovering state, the SM can discover other SMs and can negotiate for who should be the master SM. When the discovering state is complete, the SM enters a master state. In the master state, the SM proceeds with LID assignment, switch configuration, routing table calculations and deployment, and port configuration. The subnet is up and ready for use as soon as the master state is done, and the SM is responsible for monitoring the network for changes after the subnet has been configured.

Additionally, the SM can be responsible for calculating routing tables that maintain full connectivity, deadlock freedom, and proper load balancing between all source and destination pairs. Routing tables can be calculated at network initialization time and this process can be repeated whenever the topology changes in order to update the routing tables and ensure optimal performance.

During the normal operation, the SM performs periodic light sweeps of the network to check for topology change events, such as when a link goes down, when a device is added, or when a link is removed. If a change event is discovered during a light sweep or if a message (trap) signaling a network change is received by the SM, the SM can reconfigure the network according to the changes discovered. This reconfiguration can also include steps used during initialization. Moreover, a subnet management agent (SMA) residing on each device can generate responses to control packets (subnet management packets (SMPs)), and can configure local components for subnet management.

IB is a lossless networking technology, where flow-control can be performed per virtual lane (VL). VLs are logical channels on the same physical link with separate buffering, flow-control, and congestion management resources. The concept of VLs makes it possible to build virtual networks on top of a physical topology. These virtual networks, or layers, can be used for various purposes such as efficient routing, deadlock avoidance, fault-tolerance and service differentiation.

Fat-Tree Routing

In accordance with an embodiment of the invention, a fat-tree topology is a layered network topology, e.g. a balanced fat-tree can have equal link capacity at every tier. Furthermore, the fat-tree topology can be implemented by building a tree with multiple roots, e.g. the m-port n-tree definition or the k-ary n-tree definition, which can be described using an XGFT notation.

To construct larger topologies, the system can be built based on connecting several fat-trees together rather than building a single large fat-tree. Such a fat-tree built from several single fat-trees can be called a multi-core fat-tree. Multi-core fat-trees may be interconnected through the leaf switches using horizontal links or by using an additional layer of switches at the bottom of the fat-tree where every such switch is connected to all the fat-trees composing the multi-core fat-tree.

A fat-tree routing algorithm can exploit the available network resources. The fat-tree routing algorithm can include two phases: the upward phase in which the packet is forwarded from the source, and the downward phase when the packet is forwarded towards the destination. The transition between those two phases occurs at the lowest common ancestor, which is a switch that can reach both the source and the destination through its downward ports. Such a routing implementation ensures deadlock freedom, and the implementation also ensures that every path towards the same destination converges at the same root (top) node, such that all packets toward that destination follow a single dedicated path in the downward direction. By having a dedicated downward path for every destination, contention in the downward phase is effectively removed (moved to the upward stage), so that packets for different destinations only contend for output ports in half of the switches on their path. Additionally, the downward path in oversubscribed fat-trees is not dedicated and can be shared by several destinations.

Furthermore, the fabric discovery complexity for optimized fat-tree routing algorithm can be represented as $O(m+n)$ where m is the number of edges (links) and n is the number of vertices (nodes). The routing complexity is $O(k \cdot n)$, where k is the number of end-nodes and n is the number of switches.

In accordance with an embodiment of the invention, different routing algorithms, such as Layered-Shortest Path (LASH), Deadlock-Free Single-Source-Shortest-Path (DFSSSP), and MinHop routing, can be used for supporting routing in a fat-tree topology.

The LASH routing is a deterministic shortest path routing algorithm for irregular networks. All packets can be routed using the minimal path, and the algorithm achieves deadlock freedom by finding and breaking cycles through virtual lanes (VLs). Furthermore, LASH may not balance the traffic in any manner, which is evident in fat-tree fabrics. The algorithm aims at using the lowest number of VLs and, therefore, routes all possible deadlock-free pairs on the same layer, i.e. using the same links. The computing complexity for LASH is $O(n^3)$ where n is the number of nodes.

The DFSSSP routing is an efficient oblivious routing for arbitrary topologies. It uses virtual lanes to guarantee deadlock freedom and, in comparison to LASH, aims at not limiting the number of possible paths during the routing process. It also uses improved heuristics to reduce the number of used virtual lanes in comparison to LASH. The problem with DFSSSP is that for switch-to-switch traffic it assumes deadlock freedom, and does not break any cycles that may occur for switch-to-node and switch-to-switch pairs. The computing complexity for the offline DFSSSP is $O(n^2 \cdot \log(n))$ where n is the number of nodes.

The MinHop routing is the default fallback routing algorithm for the OpenSM. It finds minimal paths among all endpoints and tries to balance the number of routes per link at the local switch. However, using MinHop routing usually leads to credit loops, which may deadlock the fabric. The complexity of MinHop is given by $O(n^2)$ where n is the number of nodes.

Switch Roles Mechanism

In accordance with an embodiment of the invention, a switch roles mechanism can be used for decoupling the complex problem of fabric discovery from the routing problem.

FIG. 1 shows an illustration of supporting a switch roles mechanism in a network environment, in accordance with an embodiment of the invention. As shown in FIG. 1, a network environment 100 can include a subnet manager (SM) 101 that manages a fabric 110, e.g. an IB fabric, with a plurality of switches (e.g. switches 111-114, 121-124, and 131-134) and a plurality of host nodes (e.g. nodes 141-144).

The system can implement a switch roles mechanism for explicitly defining switch roles in the fabric 110, which can be later detected by the SM 101. For example, vendor SMP attributes 103 can be used to define a switch role 104 in the fabric 110. The vendor SMP attributes 103 can be queried via vendor specific SMPs.

Furthermore, each switch in the fabric 110 can be assigned with a hostname, an IP address and a node description. By using vendor attributes, the system can make switch roles information available to the SM 101 without having a dependency on SM 101 configuration input or any other out-of-band interfaces for providing configuration information in a dynamic manner. Additionally, the switch roles can be saved and restored as part of normal switch configuration maintenance following component replacements since it is not tied to the actual hardware instance like hardware globally unique identifiers (GUIDs).

Alternatively, the system can provide address information, such as RootGUIDs, to the routing algorithm in order to create similar effect. In such a case, the system may need to maintain a correct list following (multiple) component replacement operations.

In accordance with an embodiment of the invention, the switch roles mechanism can provide each switch in the fabric 110 with a simple role that it should adhere to. For example, the system can physically tag each switch in the fabric with its respective role. As shown in FIG. 1, the root switches 111-114 (which are placed at the top of the fabric 110 with no uplinks) can have the role "Root," and the leaf switches 131-134 (which connects to a host node at the bottom of the fabric 110) can have the role "Leaf".

Using the switch roles mechanism, the system can shorten the fabric discovery time (e.g. consistency checks may not be required). Furthermore, the system can reduce, or even eliminate, the need to discover the fabric 110 from the routing algorithm 102, which means that the probability of making a mistake during routing table generation will be much lower.

Figure 2:
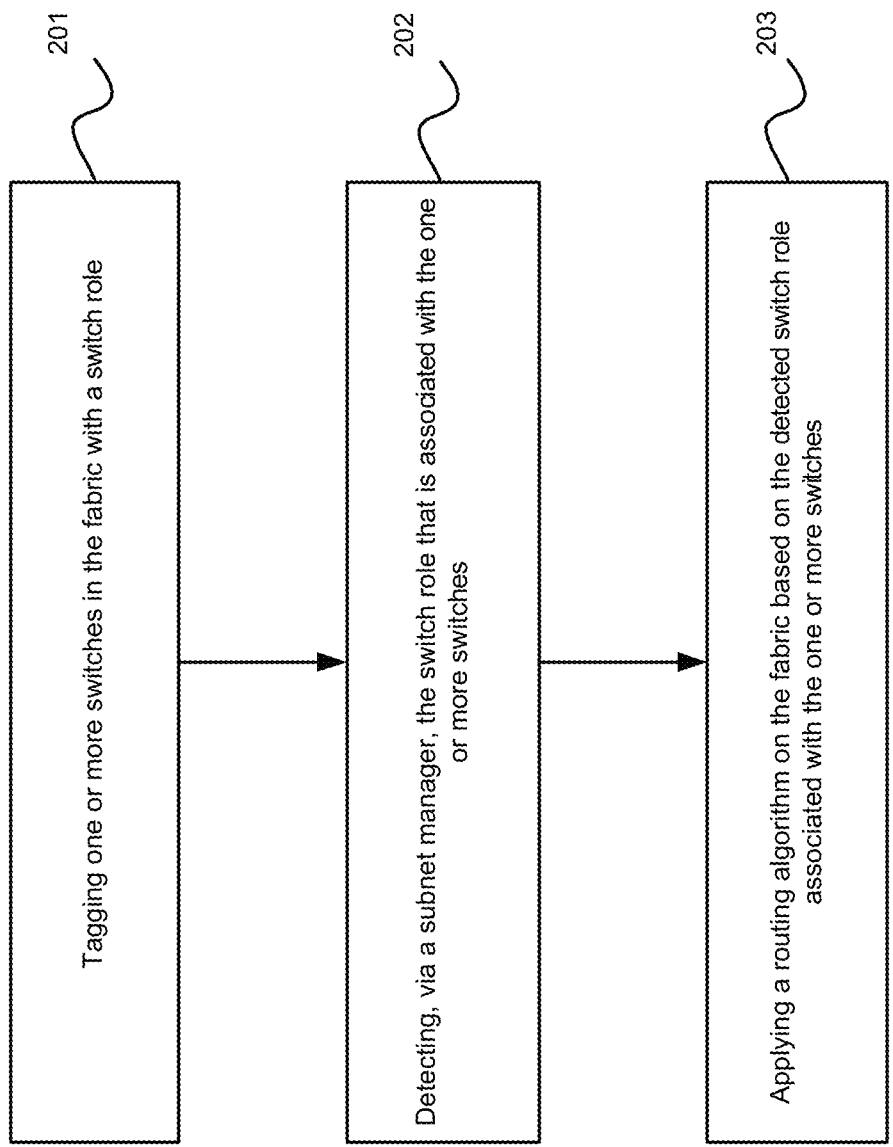
FIG. 2 illustrates an exemplary flow chart for supporting a switch roles mechanism in a network environment, in accordance with an embodiment of the invention.

FIG. 2 illustrates an exemplary flow chart for supporting a switch roles mechanism in a network environment, in accordance with an embodiment of the invention. As shown in FIG. 2, at step 201, the system allows one or more switches in the fabric to be tagged with a switch role. Then, at step 202, a subnet manager can detect the switch role that is associated with the one or more switches. Furthermore, at step 203, the subnet manager can apply a routing algorithm on the fabric based on the detected switch role associated with the one or more switches Degradded Fat-Tree In accordance with an embodiment of the invention, flaws can be identified in the existing fat-tree routing algorithm for InfiniBand (IB) networks, and the system can use different extensions that alleviate problems encountered when discovering and routing degraded fabrics. First, topology validation can be liberalized to make fat-tree routing more versatile. Second, a switch tagging can be implemented through vendor subnet management packet (SMP) attributes that can be queried via vendor specific SMPs, and the switch tagging can be used to configure the switches with specific fabric roles, which decouples topology discovery from actual routing. Additionally, the flipping switches problem can be resolved via using the SMP attributes.

In an IB network, there can be different scenarios where the fat-tree routing can fail. For example, topology validation may fail if the numbers of up and down links on any two switches on the same level are not equal. Also, the fat-tree routing may fall back to MinHop routing even when one link in the whole fabric fails.

By liberalizing the restrictions on the topology validation and disable link count inconsistency check, the fat-tree routing may not fail by default on any incomplete fat-tree. Furthermore, the system can use the switch roles mechanism to enable the fat-tree routing, e.g. the current implementation in OpenSM, to route any non-pure fat-tree fabrics that may not pass the rigorous topology validation.

Figure 3:
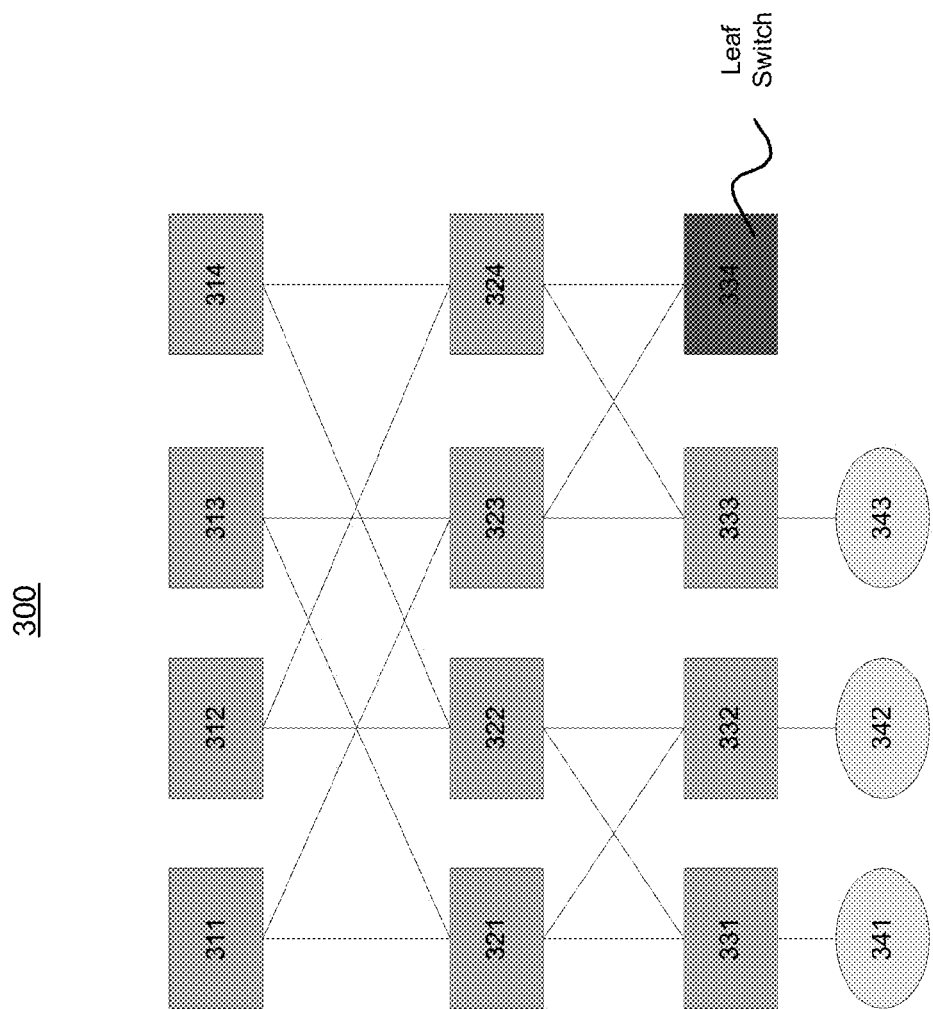
FIG. 3 shows an illustration of a degraded fat-tree in a network environment, in accordance with an embodiment of the invention.

FIG. 3 shows an illustration of a degraded fat-tree in a network environment, in accordance with an embodiment of the invention. As shown in FIG. 3, an IB fabric 300 can include a plurality of switches (e.g. switches 311-314, 321-324, and 331-334) and a plurality of host nodes (e.g. nodes 341-343).

A problem may occur in the IB fabric 300, when there exists a leaf switch, e.g. switch 334, that has no nodes connected. Thus, the IB fabric 300 turns into a degraded fat-tree.

Figure 4:
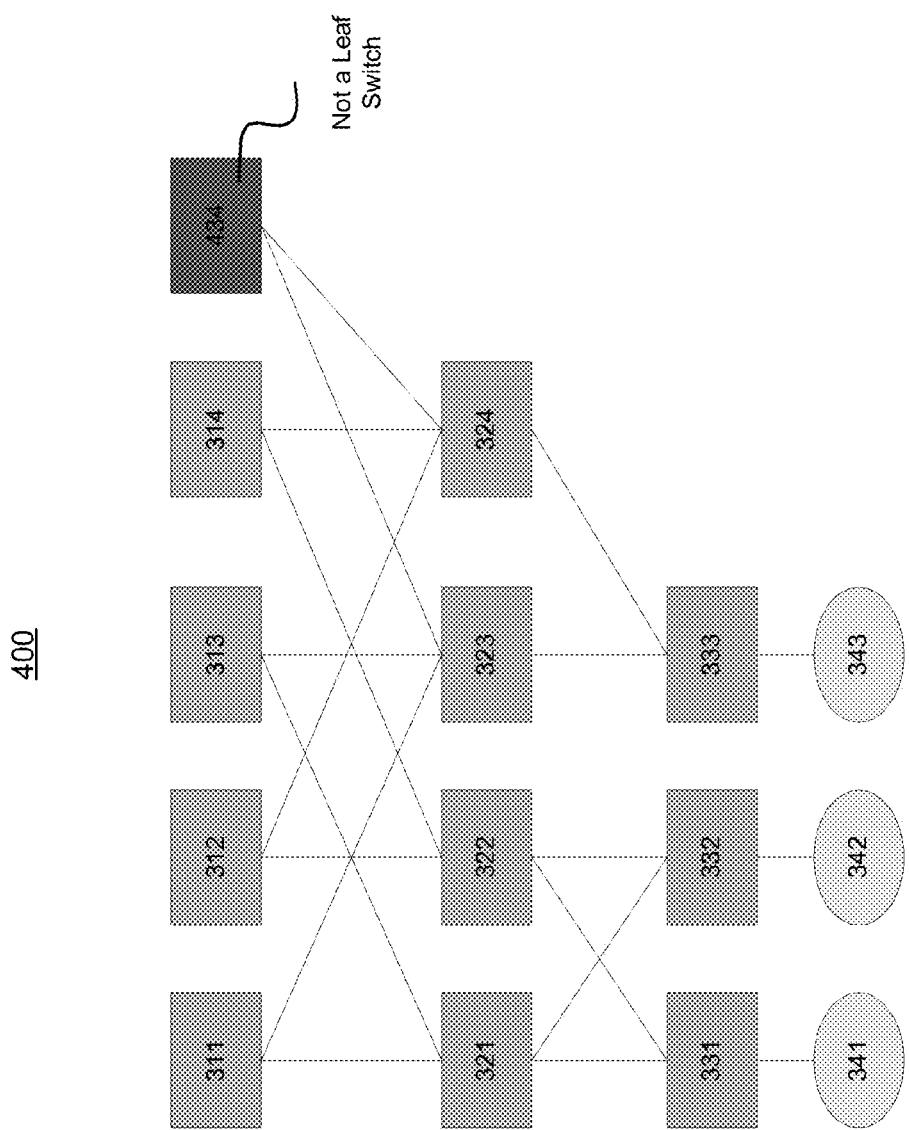
FIG. 4 shows an illustration of fixing the degraded fat-tree in a network environment, in accordance with an embodiment of the invention.

FIG. 4 shows an illustration of fixing the degraded fat-tree in a network environment, in accordance with an embodiment of the invention. As shown in FIG. 4, an IB fabric 400 can include a plurality of switches (e.g. switches 311-314, 321-324, and 331-333) and a plurality of host nodes (e.g. nodes 341-343).

Additionally, switch 434, which was originally classified as a leaf switch (as shown in FIG. 3 as switch 334), can be reclassified as not a leaf switch. As shown in FIG. 4, in order to fix the topology problem, switch 434 can be relocated at a new level, leaf level+2, with two child switches 323-324.

The fat-tree routing involving flipped switches, as shown in FIG. 4, can be counter-intuitive. Furthermore, the flipped switches makes troubleshooting in fat-tree routing difficult due to the fact that incorrect ranks need to be assigned to the switches. Also, providing a fix can be problematic, since a SM may only act reactively when a ranking conflict occurs in the fabric 400, i.e. the SM has to first detect the conflict and then rerank the fabric. This requirement can be cumbersome and the conflict may not be detectable due to the high complexity of the fabric.

In accordance with an embodiment of the invention, the system can use the switch roles mechanism to fix the flipped switches. For example, the following Algorithm 1 can be used to ensure that a switch in the fabric is always placed at the correct rank.

| Algorithm 1 osm_ftree_rank_fabric(p_tree)function |
|---|
| Require: Firmware vendor specific switch roles |
| 1: if switch has no CNs then |
| 2:    if smpquery(switch, role) == leaf then |
| 3:        switch.rank = tree_rank |
| 4:    end if |
| 5: end if |

Then, the system can run fat-tree routing on the fabric 400, using the different fat-tree routing algorithms as described in the previous sections.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting discovering and routing in a fabric with a plurality of switches, a plurality of nodes, and a subnet manager, the method comprising:

tagging each of said plurality of switches in the fabric with a switch role selected from leaf switch and root switch, wherein said tagging comprises explicitly defining the switch role in an attribute of each switch detectable by the subnet manager;

detecting, via the subnet manager, the switch role that is associated with each of the plurality of switches; and subsequent to said tagging and said detecting, applying a fat-tree routing algorithm on the fabric based on the detected switch roles associated with the plurality of switches, wherein the fat-tree routing algorithm generates a fat-tree topology having a plurality of levels.

2. The method according to claim 1, wherein said tagging step comprises:

tagging each of said plurality of switches in the fabric with a switch role selected from leaf switch and root switch, wherein said tagging comprises explicitly defining the switch role in a subnet management packet attribute of each switch detectable by the subnet manager using a subnet management packet query.

3. The method according to claim 1, wherein the method further comprises:
enforcing liberalized restrictions on fat-tree topology validation and consistency check for the fabric wherein the fat-tree routing algorithm does not fail if any two of said plurality of switches on a same level of said plurality of levels of the fat-tree topology do not have equal numbers of uplinks and downlinks.

4. The method according to claim 1, further comprising:
saving and restoring the switch role for each of said plurality of switches in an attribute of each switch as part of normal switch configuration maintenance following component replacement.

5. The method according to claim 1, further comprising:
flipping one or more switches in the fabric from one switch role to another switch role.

6. The method according to claim 1, further comprising:
detecting a connectivity error in the fabric based on the switch role.

7. The method according to claim 1, further comprising:
detecting a particular switch of said plurality of switches wherein said particular switch is tagged with the switch role of leaf switch, and wherein in the fat-tree topology said switch that has no nodes connected.

8. The method according to claim 1, further comprising:
detecting a particular switch of said plurality of switches wherein said particular switch is tagged with the switch role of leaf switch, and wherein in the fat-tree topology said particular switch that has no nodes connected; and
flipping the switch role of said particular switch from leaf switch to root switch.

9. The method according to claim 1, further comprising:
detecting a particular switch of said plurality of switches wherein said particular switch is tagged with the switch role of leaf switch, and wherein in the fat-tree topology said particular switch has no nodes connected; and
ensuring the particular switch is placed at a correct level in said fat-tree topology.

10. A system for supporting discovering and routing in a fabric, the system comprising:
one or more microprocessors,
a subnet manager running on the one or more microprocessors;
a plurality of nodes in said fabric;
a plurality of switches in said fabric, wherein each of the plurality of switches is associated with a switch role selected from leaf switch and root switch, whereby the switch role is explicitly defined in an attribute of each switch detectable by the subnet manager;
wherein the subnet manager is configured to, detect the switch role associated with each of the plurality of switches, and, subsequent to detecting the switch roles, apply a fat-tree routing algorithm on the fabric based on the detected switch roles associated with the plurality of switches, wherein the fat-tree routing algorithm generates a fat-tree topology having a plurality of levels.

11. The system according to claim 10, wherein:
the switch role is explicitly defined in a subnet management packet attribute of each switch detectable by the subnet manager using a subnet management packet query.

12. The system according to claim 10, wherein:
wherein the subnet manager is configured to apply liberalized restrictions on fat-tree topology validation and consistency check for the fabric wherein the fat-tree routing algorithm does not fail if any two of said plurality of switches on a same level of said plurality of levels of the fat-tree topology do not have equal numbers of uplinks and downlinks.

13. The system according to claim 10, wherein:
the switch role is saved and restored in an attribute of each switch as part of normal switch configuration maintenance following component replacement.

14. The system according to claim 10, wherein:
the switch role of one or more of the plurality of switches is flipped from one switch role to another switch role.

15. The system according to claim 10, wherein:
the subnet manager operates to detect a connectivity error in the fabric based on the switch role associated with one or more of the plurality of switches.

16. The system according to claim 10, wherein:
the subnet manager is configured to detect a particular switch of said plurality of switches wherein said particular switch is tagged with the switch role of leaf switch, and wherein in the fat-tree topology said switch has no nodes connected.

17. The system according to claim 10, wherein:
the subnet manager is configured to detect a particular switch of said plurality of switches wherein said particular switch is tagged with the switch role of leaf switch, and wherein in the fat-tree topology said switch has no nodes connected, and, in response, cause the switch role of the particular switch to be flipped from leaf switch to root switch.

18. A non-transitory machine readable storage medium having instructions stored thereon for supporting discovering and routing in a fabric with a plurality of switches, a plurality of nodes, and a subnet manager, which instructions, when executed cause the fabric to perform steps comprising:
tagging each of said plurality of switches in the fabric with a switch role selected from leaf switch and root switch, wherein said tagging comprises explicitly defining the switch role in an attribute of each switch detectable by the subnet manager;
detecting, via the subnet manager, the switch role that is associated with each of the plurality of switches; and
subsequent to said tagging and said detecting, applying a fat-tree routing algorithm on the fabric based on the detected switch roles associated with the plurality of switches, wherein the fat-tree routing algorithm generates a fat-tree topology having a plurality of levels.

19. The non-transitory machine readable storage medium of claim 18 wherein said steps further comprise:
enforcing liberalized restrictions on fat-tree topology validation and consistency check for the fabric such that the fat-tree routing algorithm does not fail if any two of said plurality of switches on a same level of said plurality of levels of the fat-tree topology do not have equal numbers of uplinks and downlinks.

20. The non-transitory machine readable storage medium of claim 18 wherein said steps further comprise:
detecting a particular switch of said plurality of switches wherein said particular switch is tagged with the switch role of leaf switch, and wherein in the fat-tree topology said particular switch has no nodes connected; and flipping the switch role of said particular switch from leaf switch to root switch.

* * * * *

UNITED STATES PATENT AND TRADEMARK OFFICE
CERTIFICATE OF CORRECTION

PATENT NO. : 9,130,858 B2
APPLICATION NO. : 13/839823
DATED : September 8, 2015
INVENTOR(S) : Bogdanski et al.

Page 1 of 1

It is certified that error appears in the above-identified patent and that said Letters Patent is hereby corrected as shown below:

In the specification

Column 5, line 6, delete "switches" and insert -- switches. --, therefor.

Column 5, line 7, delete "Degradded" and insert -- Degraded --, therefor.

In the claims

Column 7, line 30, claim 7, after "switch" delete "that".

Column 7, line 35, claim 8, after "switch" delete "that".

Signed and Sealed this
Thirty-first Day of May, 2016

Michelle K. Lee
*Director of the United States Patent and Trademark Office*